US006849317B1

(12) United States Patent
Oakey et al.

(10) Patent No.: US 6,849,317 B1
(45) Date of Patent: Feb. 1, 2005

(54) CARPET TILE WITH CUTOUT SECTION, METHOD AND APPARATUS FOR PRODUCTION AND METHOD OF INSTALLATION

(75) Inventors: David D. Oakey, LaGrange, GA (US); Jerry C. Hall, Woodbury, GA (US)

(73) Assignee: Interface, Inc., Atlanta, GA (US)

( * ) Notice: Subject to any disclaimer, the term of this patent is extended or adjusted under 35 U.S.C. 154(b) by 60 days.

(21) Appl. No.: 10/149,265

(22) PCT Filed: Oct. 3, 2000

(86) PCT No.: PCT/US00/27190

§ 371 (c)(1), (2), (4) Date: Aug. 30, 2002

(87) PCT Pub. No.: WO01/43925

PCT Pub. Date: Jun. 21, 2001

Related U.S. Application Data

(60) Provisional application No. 60/172,477, filed on Dec. 17, 1999.

(51) Int. Cl.[7] .......................... B32B 3/10; B32B 3/02; B32B 3/14; B44C 1/26

(52) U.S. Cl. .......................... 428/88; 428/43; 428/45; 428/48; 428/51; 428/67; 52/747.1

(58) Field of Search .......................... 428/88, 44, 45, 428/48, 51, 67, 43, 131, 134, 137, 57, 58, 62; 52/747.1, 747.11

(56) References Cited

U.S. PATENT DOCUMENTS

| | | | | | |
|---|---|---|---|---|---|
| 3,817,015 | A | * | 6/1974 | Frangos | 52/511 |
| 3,930,084 | A | * | 12/1975 | Shields | 428/67 |
| 4,097,628 | A | * | 6/1978 | Cheris et al. | 428/43 |
| 4,347,273 | A | * | 8/1982 | Dale | 428/44 |
| 5,656,109 | A | * | 8/1997 | Schilling et al. | 156/63 |
| 6,689,443 | B2 | * | 2/2004 | Kobayashi et al. | 428/48 |
| 2003/0118774 | A1 | * | 6/2003 | Tippett et al. | 428/88 |
| 2004/0142141 | A1 | * | 7/2004 | Jauregui | 428/95 |

FOREIGN PATENT DOCUMENTS

WO WO 2004066793 A1 * 8/2004 .......... A47G/27/02

* cited by examiner

*Primary Examiner*—Cheryl A. Juska
(74) *Attorney, Agent, or Firm*—John S. Pratt; Kristin J. Doyle; Kilpatrick Stockton LLP

(57) ABSTRACT

A carpet tile (11) and tile cutting apparatus (20) that produces a carpet tile with a removable cutout section (13) defined by discontinuous slits (19) and held in place by bridges (14). The apparatus includes a perimeter cutting assembly (50) and retractable inner cutting assembly (40). The perimeter cutting assembly is used to cut the carpet tile and the inner cutting assembly simultaneously forms the discontinuous slits in the inner portion of the carpet tile. The inner cutting assembly can be engaged or disengaged during the carpet tile cutting process. The carpet tile is installed by severing the bridges and laying the border sections (12) on the floor with dissimilar cutouts within the borders to create a visually interesting floor covering.

9 Claims, 3 Drawing Sheets

CARPET TILE WITH CUTOUT SECTION, METHOD AND APPARATUS FOR PRODUCTION AND METHOD OF INSTALLATION

This application is a 371 of PCT/US00/27190 filed Oct. 3, 2000 which claims benefit of 60/172,477 Dec. 17, 1999.

FIELD OF THE INVENTION

This invention relates to carpet tile and, more specifically, to carpet tile with a removable cutout section, a cutter assembly for manufacturing carpet tiles with removable cutout sections and a method for installing carpet tiles with removable cutout sections.

BACKGROUND OF THE INVENTION

Carpet tile is normally manufactured by producing a long web of tile material and then cutting square tiles from the web. Identical tiles installed side-by-side provide an attractive, but sometimes uninteresting, carpeted floor surface. As a result, enormous effort has been expended to produce patterned tiles having variations in pile, color and other properties for aesthetic reasons. Dissimilar tiles have sometimes been installed in a checkerboard or other pattern, and dissimilar tiles have sometimes been cut up and then reassembled, as suggested. for instance, in U.S. Pat. No. 5,324,562 for "Multiple segment carpet tile and methods and apparatus for production of such tile."

Such prior efforts are either very limited in effectiveness or, as is the case with respect to U.S. Pat. No. 5,324,562, are labor intensive and expensive to practice.

SUMMARY OF THE INVENTION

This invention consists of a carpet tile cutting assembly, a carpet tile and a method for installing the carpet tile. The carpet tile cutting assembly produces carpet tiles with a discontinuous slit forming a removable cutout section having a desired shape, such as a square. The cutting assembly includes two sets of knives for cutting each tile and the discontinuous slit that defines the cutout section. The cutout section is held in place by bridge material formed by interruptions in the slit. The shaped cutout sections can be removed during installation by cutting the bridging material at the slit interruptions, and cutouts can be substituted for each other or quarter or half turned in place to form a pattern in the floor covering.

It is a primary object of this invention to provide a carpet tile cutting apparatus for manufacturing carpet tiles with attached but removable cutout sections. It is a further object of this invention to cost effectively manufacture carpet tile with removable cutout sections. Another object of this invention is to manufacture carpet tiles with attached but easily removable cutout sections that are interchangeable. Still a further object is to produce a carpet tile with a removable cutout section that can be manufactured and shipped without incurring any variable costs in addition to the cost of manufacture of conventional tiles. An additional object of this invention is to provide a method for installing a carpet tile with a removable cutout section to form a patterned floor covering. A further object of this invention is to manufacture carpet tile with removable cutout sections that can be installed without removing the cutout section. Still further objects and advantages will become apparent from the following description, the accompanying drawings and the claims.

DETAILED DESCRIPTION OF THE DRAWINGS

Figure 1:
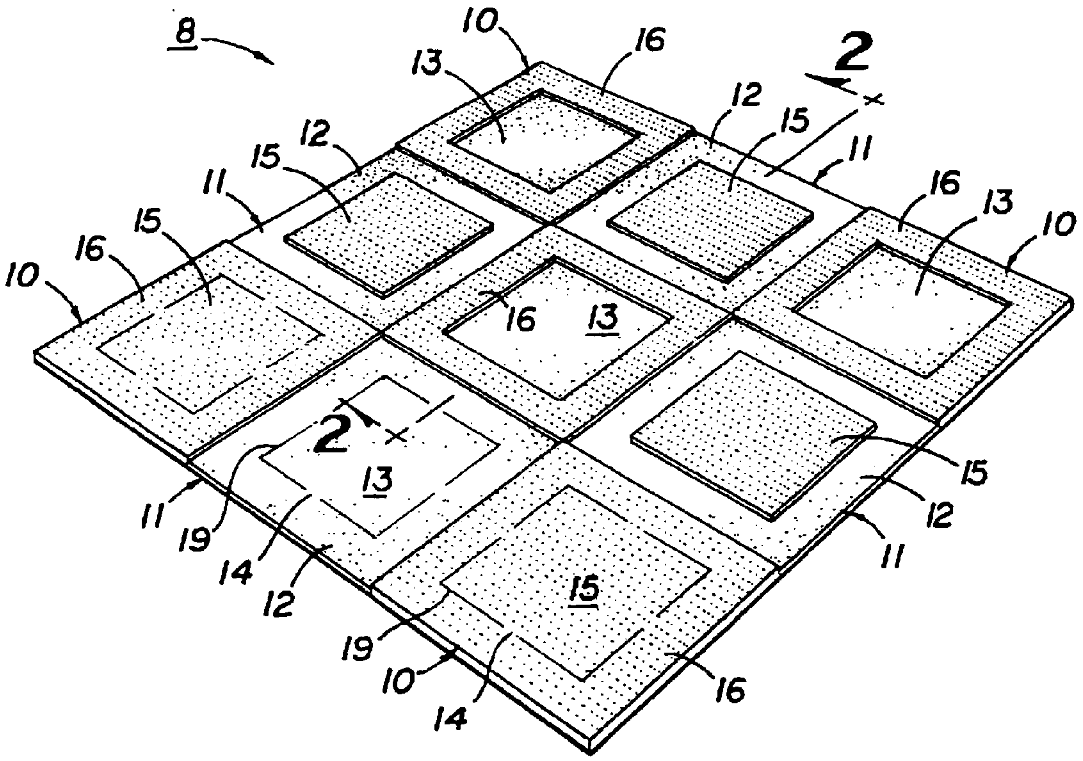
FIG. 1 is a perspective view of an exemplary carpet tile installation of this invention.

FIG. 1 shows a layout 8 of die cut carpet tiles 10 and 11 with interchangeable cutout sections 13 and 15 inside border sections 12 and 16. Tiles 10 and 11 in layout 8 are of two types. For instance, tiles 10 may have high pile, while tiles 11 have lower pile, or tile 10 and 11 may be of different colors. Tiles 10 and 11 are laid in an alternating pattern. Each tile 10 and 11 is manufactured with a central section 13 and 15 defined by a cut line 19 having a generally closed form, such as a square. Gaps in the cut line 19 leave bridges 14 that attach the cutout sections 13 and 15 to the border sections 12 and 16 respectively. The interchangeable cutout centers 13 and 15 are removable from their respective border sections 12 and 16 by severing the bridges 14 at the installation site, for instance, with a utility knife. The cutout sections 13 and 15 are removed from their respective border sections 12 and 16 and swapped into another border section 16 and 12, respectively, to form a pattern. The pattern can be formed by varying many different aspects of the tile; for example, carpet color, pile height, knap, orientation of the cutout, or any other aesthetic aspect of the overall carpet tile.

Figure 2:
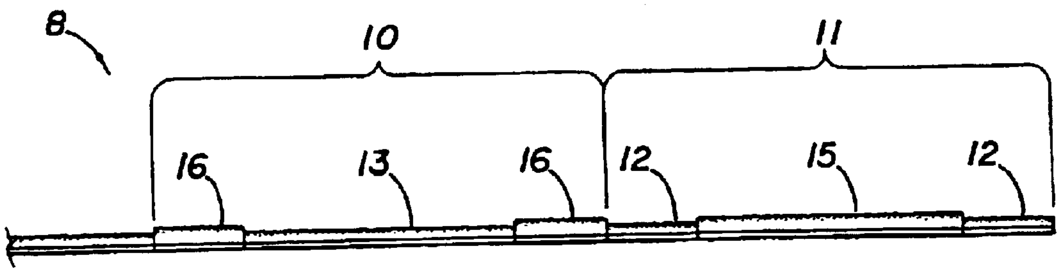
FIG. 2 is an schematic cross-section of the carpet taken along lines 2—2 in FIG. 1.

FIG. 2 shows a cross-sectional view of the carpet tiles 10 and 11 with swapped or rotated cutout sections 13. Each cutout section 13 and 15 is removed from the tiles 10 or 11 and placed in a dissimilar border 16 and 12, respectively. The carpet tiles 10 and 11 can be manufactured and shipped with the cutout section secured in place by bridges 14. During installation, the installer can severe the bridges 14, with a utility knife, remove the cutout sections 13 and 15 and swap them among the tiles 10 and 11 or simply rotate them within the tile border 12 and 16 from which they came to form a pattern. Alternatively, tiles 10 and 11 can be installed without removing the cutout section.

Conventional carpet tiles are typically cut from a web of tile material with a reciprocating knife assembly that severs a group of tiles from the web, is retracted so that the web can be advanced, and then severs another group of tiles. Tiles 10 and 11 with the centrally located cutouts 13 and 15 of this invention can be produced by adding to the conventional knife assembly a set of knives to form the central cutouts. Such knives for the cutouts can be fixed in relation to the tile perimeter knives so that cutout cut lines 19 are always formed. Alternatively, as is illustrated in FIGS. 3, 4A and 4B, the cutout forming knives can be retractable for selective use.

Figure 3:
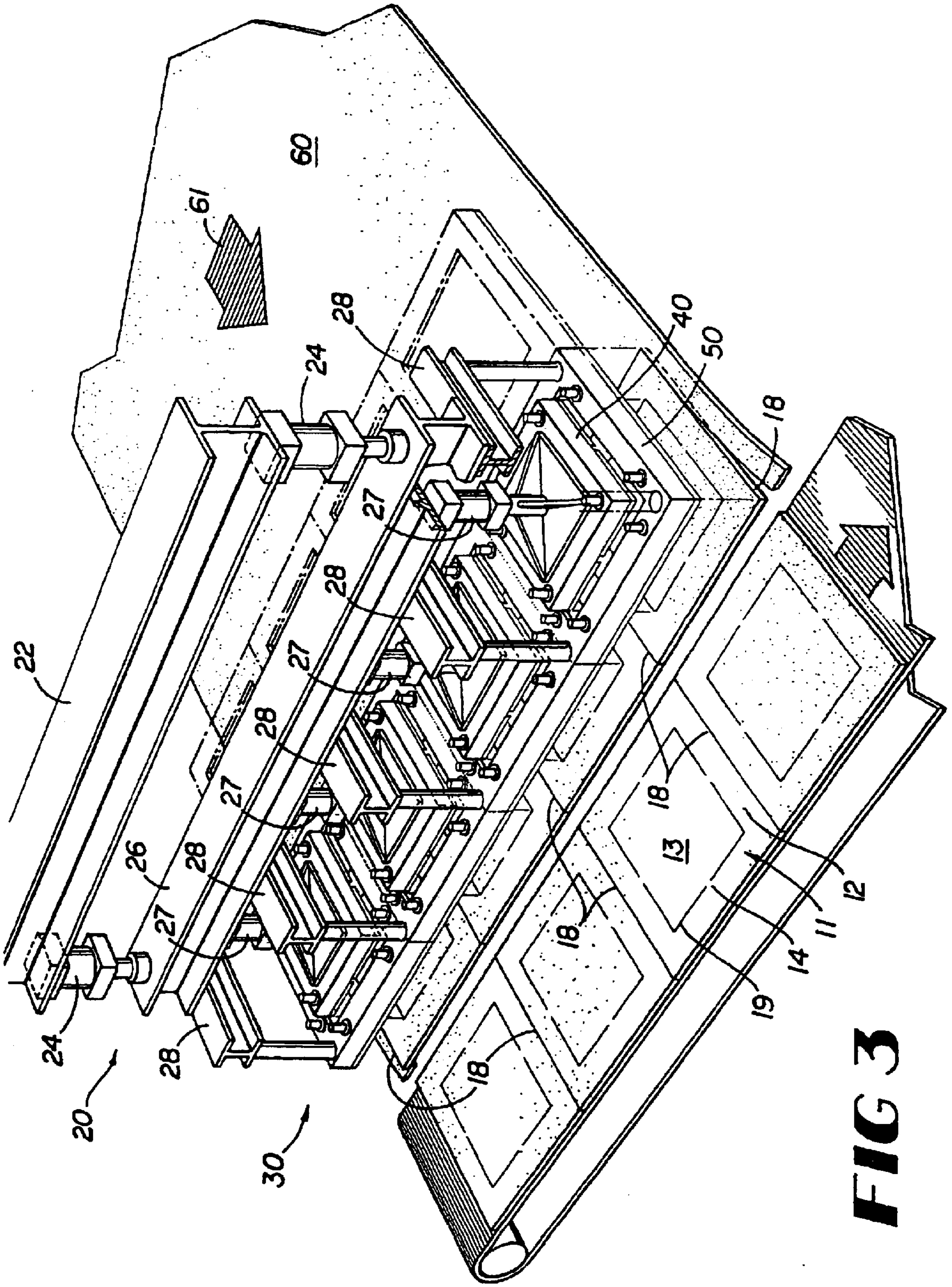
FIG. 3 is a perspective view of a compound cutter assembly of this invention.
Figure 4A:
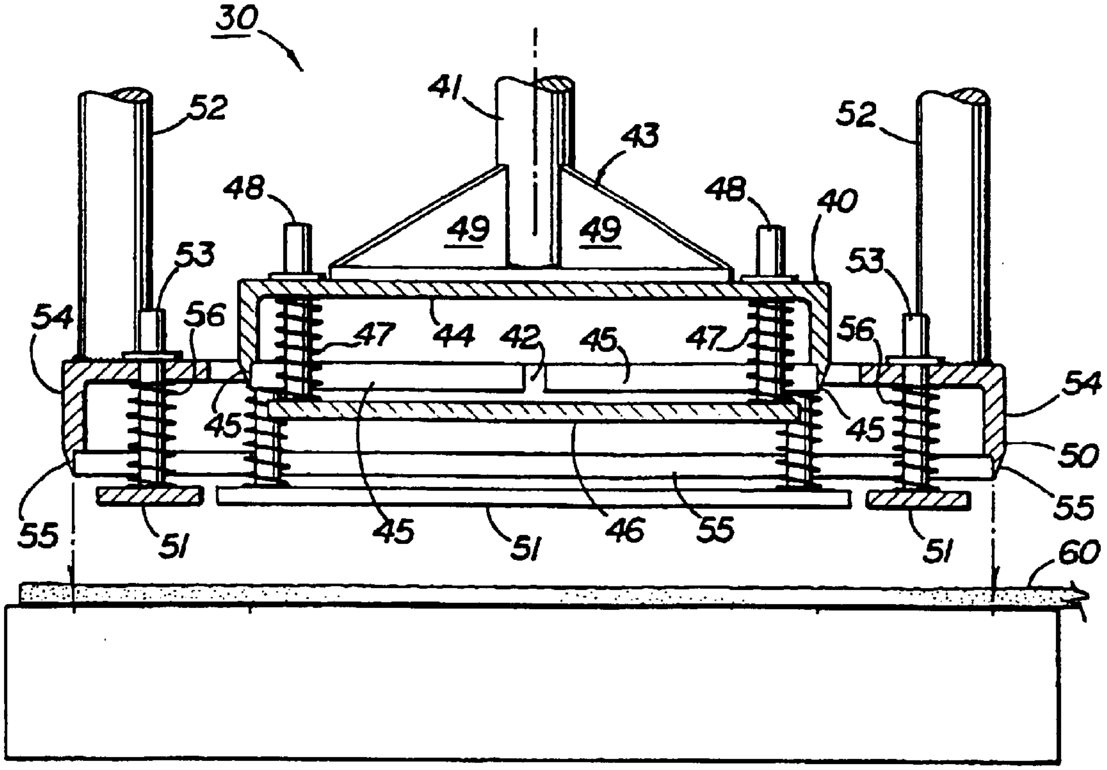
FIG. 4A is a front elevation view of a portion of the cutter assembly shown in FIG. 3 with the insert cutter and spring loaded foot assembly in the raised, disengaged position.
Figure 4B:
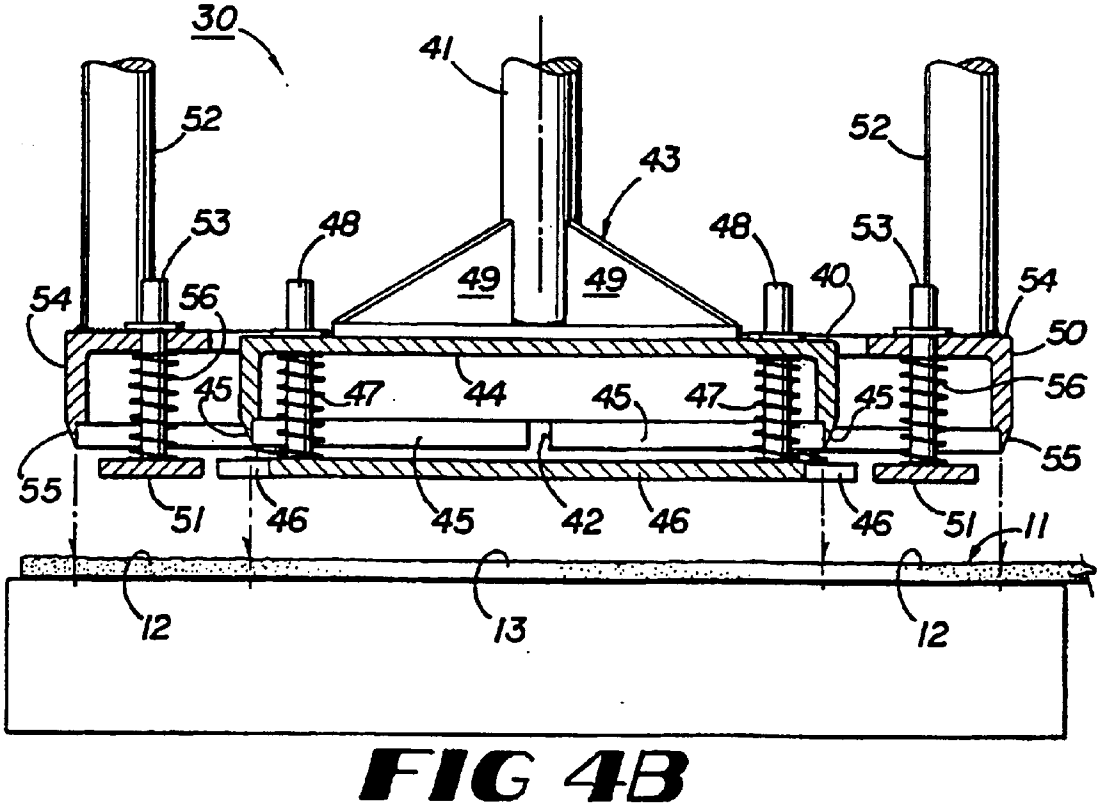
FIG. 4B is the front elevation view of FIG. 3 with the insert cutter and foot assembly in the lowered, engaged position to form the cutout section when the tile perimeter is cut.

For illustrative purposes, FIG. 3 shows the tile cutting apparatus operating on a web 60 with low pile height; however, the cutting apparatus 20 can be used on all types of webbing. FIG. 3 shows a tile cutting apparatus 20 usable to cut carpet tiles 10 and 11 from web of carpet tile material 60 having a "machine direction" indicated by arrow 61 in FIG. 3. The tile cutting apparatus 20 is connected to a fixed beam 22 by die assembly press cylinders 24. The die assembly press cylinders 24 may be air or hydraulically actuated cylinders, but electro-mechanical or other actuators could be used to drive the assembly down to engage web 60 and up so that the web 60 can be advanced. Thus, tile cutting apparatus 20 moves vertically relative to the fixed beam 22 and web of tile material 60. The tile cutting apparatus 20 includes fixed knives 55 that always engage the web 60 when cylinders 24 are actuated to cut the web of tile material into tiles 11 along tile separation lines 18 (shown in FIG. 3). The schematically illustrated cutting apparatus 20 includes retractable inner cutting assembly 40 that make cut lines 19. Each retractable inner cutting assembly 40 includes knives 45 and foot assemblies 46 that can create the cutout section 13 at the same time tile 11 is cut out by the fixed knives 55. The retractable inner cutting assembly 40 can be actuated by an air cylinder 27 or by other means including manual movement between operational and retracted positions.

Unlike the outer cutting assembly 50, the inner cutting assembly 40 moves in relation to the carpet tile cutting apparatus 20 and the outer cutting assembly 50. This upward and downward movement allows the inner cutting assembly 40 to be moved between engaged and disengaged positions. This is advantageous because carpet tile 11 can be manufactured with or without an attached cutout section 13 depending upon the position of the inner cutting assembly 40.

Alternatively, knives 45 can be fixed relative to knives 55 so that cut lines 19 are always formed at the same time that tile 11 is cut from web 60. In order to manufacture the carpet tile 11, a web of tile material 60 is fed under the tile cutting apparatus 20. Once the web 60 is in position, the tile cutting apparatus 20 moves downward engaging the web 60. If the inner cutting assembly 40 is in the lower, operative position, it too will engage the web 60 creating a discontinuous cut line 19 defining the cutout section 13 and bridges 14. If the inner cutting assembly 40 is in the raised disengaged position, a conventional carpet tile 11 will be formed without a cutout section 13.

FIGS. 4A and 4B show a single cutting assembly 30 with an outer cutting assembly 50 and an inner cutting assembly 40 disengaged and engaged, respectively. The inner cutting assembly 40 includes multiple blades 45 mounted to a die plate 44. The knives 45 attach to a foot 43 on the end of arm 41 attached to cylinder 27 that moves knives 45 down to engage the web 60, as illustrated in FIG. 4B, or up, disengaged, as shown in FIG. 4A. A foot plate 46 mounted to the die plate 44 by rods 48 and springs 47 applies pressure on the web 60 as knives 45 cut the web 60 to facilitate a clean, accurately positioned cut. Gaps 42 in blades 45 leave bridges 14 in cutlines 19.

The outer cutting assembly 50 include blades 55 that are attached to a perimeter die plate 54 in an arrangement that forms the perimeter of the carpet tile 11. The foot plates 51 mounted on rods 53 are forced against web 60 by springs 56 to exert pressure on the web 60 as the blades 55 cut the carpet tile 11 to facilitate a clean, accurately positioned cut. The perimeter die plate 54 is attached to stanchions 52. The stanchions 52 are connected to the transverse perimeter die frames 28 (FIG. 1). The stanchions 52 secure the perimeter die 50 to the tile cutting apparatus 20.

Since the carpet tiles 10 and 11 can be manufactured with attached cutout sections 13 and 15 in the same operation that cuts tiles 10 and 11 out of web 60, manufacture of carpet tiles 10 and 11 with cutouts 13 and 15 incurs no additional expense apart from the equipment expense, and require no additional manufacturing steps or time and no additional handling, since the cutouts remain attached. Since the carpet tiles 10 and 11 can be manufactured and shipped with the attached cutout sections 13 and 15, installation flexibility is available. During installation, an installer can lay the carpet tile 10 or 11 as shipped or he can remove the cutout sections 13 and 15, for instance, with a utility knife or other cutter by severing the bridges 14. Once the cutout section 13 is removed, the installer can swap or rotate the cutout sections 13 and 15 among the installed border sections 12 and 16 to create a pattern. Many aesthetic features can be used to form the pattern in the carpet tile layout 8 (FIG. 1). For example, the cutout sections 13 and 15 can be formed in many shapes, including circles, squares, triangles and an infinite variety of other shapes. In addition, the pile height and knap can be varied to create a textural pattern. Furthermore, carpet color can be varied to form a color pattern. Any combination of the above examples or other attributes of carpet tile can be combined to form a multi-colored, multi-shaped textural pattern.

The forgoing is provided for purposes of illustrating, explaining, and describing embodiments of the present invention that provides techniques and devices for the manufacture of carpet tiles with removable cutout sections and methods for installing these tiles to create a pattern. Modifications and adaptations to these embodiments will be apparent to those skilled in the art and may be made without departing from the spirit of the invention or the scope of the following claims

We claim:

1. A carpet tile having a slit defining a cutout section having a shape, wherein the cutout shape is removable from the carpet tile to form an opening having the shape in the carpet tile and wherein the tile is adapted to have the cutout shape removed or rotated at an installation site.

2. The carpet tile of claim 1, wherein the shape is a square.

3. A carpet tile having a slit defining a cutout section having a shape, wherein the cutout shape is removable from the carpet tile to form an opening having the shape in the carpet tile, wherein the slit is discontinuous, leaving at least one connection between the cutout section and another portion of the tile.

4. A method for installing carpet tile on a floor at an installation site, comprising:

providing at least first and second carpet tiles, each of which comprises a cutout section and a border section;

removing the cutout section from the first tile;

removing the cutout section from the second tile;

positioning a border section of the first tile on the floor with the second tile cutout section within the first border; and positioning the border section of the second tile on the floor with the first tile cutout section within the second border.

5. The method of claim 4, wherein the first and second carpet tiles each are manufactured and transported to the installation site with a discontinuous slit separating the cutout section from the border section of each tile and leaving at least one bridge connecting the cutout section to the border section, and further comprising severing the bridges before removing the cutout section of each tile from the border of that tile.

6. The method of claim 5, wherein each file has four bridges.

7. The method of claim 5, wherein the shape of each cutout section is square.

8. A carpet installation, comprising:

a plurality of at least two types of carpet tile borders positioned on a floor; and at least two types of carpet tile cutout shapes positioned on the floor within the borders so that each cutout shape is of a different type of carpet tile from the border within which it is positioned.

9. A carpet tile installation, comprising:

positioned on a floor, a plurality of similar carpet tile borders having a machine direction; and carpet tile shapes having a machine direction positioned on the floor within the borders so that the machine direction of each carpet tile shape differs from the machine direction of the border within which it is positioned.

* * * * *